United States Patent
Tsutsui et al.

(10) Patent No.: US 9,459,494 B2
(45) Date of Patent: *Oct. 4, 2016

(54) LIQUID CRYSTAL ALIGNING AGENT AND LIQUID CRYSTAL DISPLAY DEVICE EMPLOYING IT

(71) Applicant: Nissan Chemical Industries Limited, Tokyo (JP)

(72) Inventors: Kimiaki Tsutsui, Funabashi (JP); Takahiro Sakai, Funabashi (JP); Kohei Goto, Funabashi (JP)

(73) Assignee: NISSAN CHEMICAL INDUSTRIES, LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/038,204

(22) Filed: Sep. 26, 2013

(65) Prior Publication Data

US 2014/0023798 A1    Jan. 23, 2014

Related U.S. Application Data

(63) Continuation of application No. 12/173,372, filed on Jul. 15, 2008, now abandoned, which is a continuation of application No. 10/538,264, filed as application No. PCT/JP03/15803 on Dec. 10, 2003, now abandoned.

(30) Foreign Application Priority Data

Dec. 11, 2002 (JP) .............................. 2002-359225

(51) Int. Cl.
G02F 1/1337 (2006.01)
C08G 73/10 (2006.01)
C09K 19/56 (2006.01)

(52) U.S. Cl.
CPC ......... G02F 1/133723 (2013.01); C08G 73/10 (2013.01); C09K 19/56 (2013.01); *Y10T 428/1023* (2015.01)

(58) Field of Classification Search
CPC .................. B32B 2457/202; G02F 1/133723; Y10T 428/1023
See application file for complete search history.

(56) References Cited

U.S. PATENT DOCUMENTS

| 5,158,619 | A | 10/1992 | Kawada et al. |
| 5,744,203 | A | 4/1998 | Harada et al. |
| 5,756,650 | A | 5/1998 | Kawamonzen et al. |
| 6,294,639 | B1 | 9/2001 | Sawahata et al. |
| 6,808,766 | B1 | 10/2004 | Miyama et al. |
| 7,498,068 | B2 | 3/2009 | Tsutsui et al. |
| 7,524,541 | B2 * | 4/2009 | Tsutsui et al. ............... 428/1.26 |
| 2006/0024452 | A1 | 2/2006 | Kondo et al. |
| 2006/0051525 | A1 | 3/2006 | Tsutsui et al. |

FOREIGN PATENT DOCUMENTS

| JP | 61-217020 | | 9/1986 |
| JP | 3-153786 | | 7/1991 |
| JP | 6-222368 | | 8/1994 |
| JP | 11-264984 | | 9/1999 |
| JP | 11-335461 | | 12/1999 |
| JP | 2000-44683 | | 2/2000 |
| JP | 2001-40209 | A | 2/2001 |
| JP | 2001-100209 | A | 4/2001 |
| TW | 428006 | | 4/2001 |
| TW | 434277 | | 5/2001 |
| TW | 455730 | | 9/2001 |
| TW | 460738 | | 10/2001 |
| TW | 487824 | | 5/2002 |

OTHER PUBLICATIONS

Taiwanese Office Action issued Jun. 30, 2010 and Taiwanese Search Report issued May 30, 2010 in Taiwnese Application No. 092135068 (with English Translation).

* cited by examiner

*Primary Examiner* — Gregory Listvoyb
(74) *Attorney, Agent, or Firm* — Oblon, McClelland, Maier & Neustadt, L.L.P.

(57) ABSTRACT

To provide a liquid crystal aligning agent useful to obtain a liquid crystal alignment film excellent in liquid crystal alignment properties, alignment controlling power and rubbing resistance, having high voltage retention characteristics and having reduced charge accumulation, and a liquid crystal display device which is less susceptible to display failure, to lowering of contrast or to image persistence.

A liquid crystal aligning agent comprising a low resistance polyimide precursor having a volume resistivity of from $1\times10^{10}$ to $1\times10^{14}$ Ωcm when formed into a film, and a high alignment polyimide precursor or polyimide having a specific structure, and a liquid crystal display device employing this liquid crystal aligning agent.

18 Claims, 1 Drawing Sheet

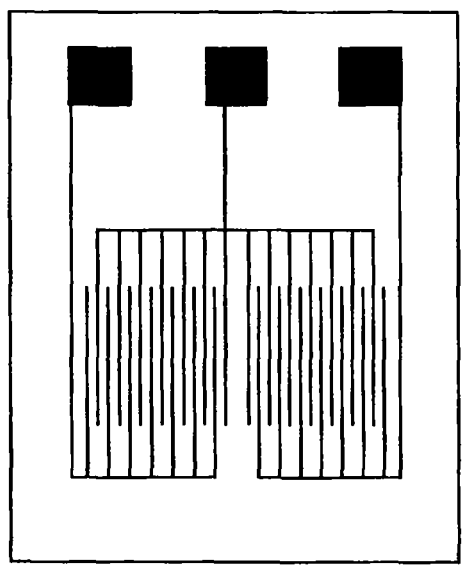

LIQUID CRYSTAL ALIGNING AGENT AND LIQUID CRYSTAL DISPLAY DEVICE EMPLOYING IT

The present application is a continuation application of Ser. No. 12/173,372, pending, which is a continuation application of Ser. No. 10/538,264, now abandoned, which is a national stage application of PCT/JP03/15803 having a filing date of Dec. 10, 2003 and claiming priority to Japanese patent application 2002-359225 having a filing date of Dec. 11, 2002.

TECHNICAL FIELD

The present invention relates to a liquid crystal aligning agent to be used for forming a liquid crystal alignment film, and a liquid crystal display device employing it.

BACKGROUND ART

Liquid crystal display devices are presently widely used as display devices which can realize thin structure/light weight. The display characteristics of liquid crystal display devices are known to be substantially influenced by the alignment of liquid crystal, the pretilt angle of liquid crystal, the stability of the pretilt angle, electrical characteristics, etc. In order to improve the display characteristics of such liquid crystal display devices, not only the liquid crystal material to be used but also the liquid crystal alignment film which uniformly aligns the liquid crystal becomes important. If the liquid crystal alignment film has low liquid crystal alignment properties, image failure may occur, and if the alignment controlling power of liquid crystal is low, the liquid crystal which has been continuously driven will not recover to the initial state, thus causing persistence of the displayed image. Further, the liquid crystal alignment film also has an influence over the voltage retention characteristics and the charge accumulation characteristics when the liquid crystal is driven. If the voltage retention is low, the contrast on the displayed image may decrease, and if accumulation of the charge against a DC voltage is significant, persistence of the displayed image may occur. Further, a rubbing treatment is presently commonly carried out for formation of a liquid crystal alignment film. If the rubbing resistance of the liquid crystal alignment film is low, the film may be separated or the film surface may be scraped away by rubbing, which may cause display failure.

In order to solve such problems as peeling of the film by rubbing, the liquid crystal alignment properties and the voltage retention characteristics, a liquid crystal alignment film comprising a mixture of a polyamic acid having an alkylene structure at the diamine moiety and a polyamic acid having an aliphatic structure at the tetracarboxylic acid moiety has been proposed (e.g. JP-A-11-264984, JP-A-11-335461). However, characteristics required for a liquid crystal alignment film become strict along with an improvement in performance of liquid crystal display devices, and it becomes difficult to satisfy all the required characteristics only with conventional technique.

DISCLOSURE OF THE INVENTION

Under these circumstances, it is an object of the present invention to provide a liquid crystal aligning agent to provide a liquid crystal alignment film excellent in liquid crystal alignment properties, liquid crystal controlling power and rubbing resistance, having high voltage retention characteristics and having reduced charge accumulation, and a liquid crystal display device which hardly causes image failure, decrease in contrast, persistence of the image, etc.

The present inventors have conducted extensive studies to achieve the above object and as a result, have found the present invention. Namely, the above object has been found to be achieved by a liquid crystal aligning agent comprising a polyimide precursor having a structural unit represented by the formula (1) and having a volume resistivity of from $1\times10^{10}$ to $1\times10^{14}$ $\Omega$cm when formed into a film, and a polyimide precursor having a structural unit represented by the formula (2-1) or a polyimide having a structural unit represented by the formula (2-2), and a liquid crystal display device employing this liquid crystal aligning agent:

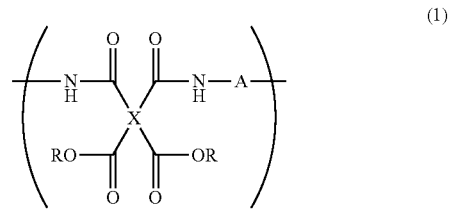
(1)

in the formula (1), R represents a hydrogen atom or an alkyl group, X represents a tetravalent organic group, and A represents a bivalent organic group,

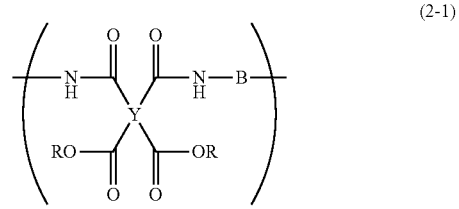
(2-1)

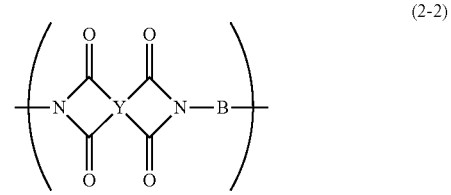
(2-2)

in the formulae (2-1) and (2-2), R represents a hydrogen atom or an alkyl group, Y represents a tetravalent organic group, B represents a bivalent organic group, and from 10 to 100 mol % of B is a bivalent organic group having any one of the following structures (3) to (5) in its structure, or a paraphenylene group:

(3)

in the formula (3), $m_1$ is an integer of from 1 to 18,

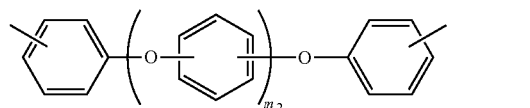
(4)

in the formula (4), one or a plurality of optional hydrogen atoms on the benzene rings may be substituted by a monovalent organic group other than a primary amino group, and $m_2$ is an integer of from 0 to 8,

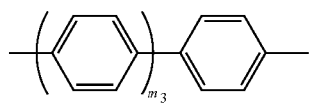

(5)

in the formula (5), one or a plurality of optional hydrogen atoms on the benzene rings may be substituted by a monovalent organic group other than a primary amino group, and $m_3$ is an integer of from 1 to 4.

BRIEF DESCRIPTION OF THE DRAWING

FIG. 1: a schematic view illustrating a two pixel in-plane switching comb electrode used in Examples.

BEST MODE FOR CARRYING OUT THE INVENTION

Now, the present invention will be explained in detail below.

The liquid crystal aligning agent of the present invention is a composition to be used for formation of a liquid crystal alignment film, and is characterized by comprising a polyimide precursor (hereinafter referred to as a specific polymer a) as a low resistance component having a structural unit represented by the formula (1) and having a volume resistivity of from $1\times10^{10}$ to $1\times10^{14}$ Ωcm and a polyimide precursor as a high alignment component having a structural unit represented by the formula (2-1) or a polyimide as a high alignment component having a structural unit represented by the formula (2-2) (hereinafter referred to as a specific polymer b).

As the contents of the specific polymers a and b, the specific polymer a is contained in an amount of from 10 to 95 wt %, more preferably from 60 to 90 wt %, based on the total amount of the specific polymers a and b. Namely, the specific polymer b is contained in an amount of from 90 to 5 wt %, more preferably from 40 to 10 wt %, based on the total amount of the specific polymers a and b. If the amount of the specific polymer a is too small, the charge accumulation characteristics and the rubbing resistance of the liquid crystal alignment film tend to deteriorate, and if the amount of the specific polymer b is too small, the alignment properties and the alignment controlling power of liquid crystal tend to deteriorate. One type or at least two types may be used as each of the specific polymers a and b to be contained in the liquid crystal aligning agent of the present invention. Further, in order to further improve the rubbing resistance of the liquid crystal alignment film, one of X in the formula (1) and Y in the formula (2-1) or (2-2) preferably has an alicyclic structure or an aliphatic structure.

Specific Polymer a

The specific polymer a is a polyimide precursor as a low resistance component, and has a volume resistivity of from $1\times10^{10}$ to $1\times10^{14}$ Ωcm, preferably from $1\times10^{12}$ to $1\times10^{14}$ Ωcm, more preferably from $1\times10^{12}$ to $5\times10^{13}$ Ωcm. The volume resistivity is a value represented when the polyimide precursor is formed into a film. If the resistivity is too high, the image persistence/irregularity due to charge accumulation may occur, and if it is too low, the voltage retention characteristics may deteriorate. The liquid crystal aligning agent of the present invention is usually coated on a substrate and then baked, and thus the specific polymer a preferably has the above volume resistivity after baking. The baking temperature is from 100 to 350° C., preferably from 150 to 300° C., more preferably from 200 to 250° C., particularly preferably 220° C.

The volume resistivity of the specific polymer a can be confirmed as follows.

A solution of the specific polymer a is coated on a glass substrate provided with ITO transparent electrodes by e.g. spin coating, the solvent is evaporated on a hotplate of about 80° C., and then baking at an aimed temperature is carried out to form a coated film having a thickness of about 1 μm. Aluminum is deposited on the surface of the coated film via a mask to form an upper electrode of from about 0.05 to about 0.1 cm², whereby a sample for measuring the volume resistivity is obtained. A voltage of 10 V is applied between the ITO electrode and an aluminum electrode of this sample, and the current 60 seconds after application of the voltage is measured. The volume resistivity is calculated from measured values of the current, the area of the electrode and the film thickness.

In the formula (1), A is a bivalent organic group, and one type or a mixture of at least two types may be used. Further, although the structure is not particularly limited, at least one type is preferably a bivalent organic group having a nitrogen atom. The bivalent organic group having a nitrogen atom may, for example, be a bivalent organic group having a cyclic structure containing a nitrogen atom, such as a pyridine ring, a pyrimidine ring, a triazine ring, a piperidine ring or a piperazine ring, or a bivalent organic group having a nitrogen-containing group such as a secondary or higher amino group, an amide group or a urea group. Among these bivalent organic groups having a nitrogen atom, particularly preferred is a bivalent organic group having one of the following structures (6) and (7):

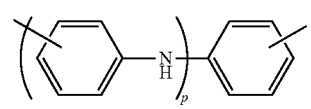

(6)

In the formula (6), p is an integer of from 1 to 5, and in view of the alignment properties of liquid crystal, p is preferably 1, and more preferred is a diphenylamine group having bonds at 4,4'-positions.

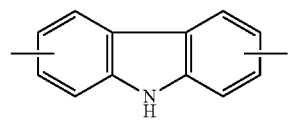

(7)

The structure of the formula (7) is preferably a carbazole group having bonds at 3,6-positions in view of the alignment properties of liquid crystal.

In the above structure (6) or (7), one or a plurality of optional hydrogen atoms in the benzene rings may be substituted by a monovalent organic group other than a primary amino group. Such a monovalent organic group may, for example, be a $C_{1-20}$ alkyl group, a $C_{2-20}$ alkenyl group, a $C_{1-20}$ alkoxy group, a $C_{1-20}$ fluorine-containing alkyl group, a $C_{2-20}$ fluorine-containing alkenyl group, a $C_{1-20}$ fluorine-containing alkoxy group, a cyclohexyl group, a phenyl group, a fluorine atom or a group comprising a combination thereof. In view of the alignment properties of liquid crystal, it is preferably a monovalent organic group selected from the group consisting of a $C_{1-4}$ alkyl group, a $C_{2-4}$ alkenyl group, a $C_{1-4}$ alkoxy group, a $C_{1-4}$ fluorine-containing alkyl group, a $C_{2-4}$ fluorine-containing alkenyl group and a $C_{1-4}$ fluorine-containing alkoxy group. The more preferred structure (6) or (7) is one having no hydrogen atoms on the benzene rings substituted.

In A in the formula (1), the proportion of A having a nitrogen atom is preferably from 10 to 100 mol %, more preferably from 60 to 100 mol %. When the proportion of A having a nitrogen atom is at least 10 mol %, the volume resistivity can be effectively lowered, and a polyimide precursor having an aimed volume resistivity can easily be obtained. Particularly in the case of the structure (6) or (7), the polyimide precursor will have not only a moderate volume resistivity but also has favorable voltage retention characteristics, and further, excellent charge accumulation characteristics and rubbing resistance will be imparted to the liquid crystal alignment film.

Further, for A in the formula (1), a bivalent organic group having a substituent known to have an effect to increase the tilt angle, such as a long-chain alkyl group, a perfluoroalkyl group or a steroid skeleton group, may be present for the purpose of increasing the pretilt angle of liquid crystal.

X in the formula (1) is a tetravalent organic group, and one type or at least two types may be present. The structure is not particularly limited, but at least one type is preferably a tetravalent organic group having an alicyclic structure or a tetravalent organic group having an aliphatic structure with a view to obtaining high voltage retention characteristics and rubbing resistance. In such a case, proportion of the tetravalent organic group having an alicyclic structure or the tetravalent organic group having an aliphatic structure in X is preferably from 20 to 100 mol %, more preferably from 50 to 100 mol %. The tetravalent organic group having an alicyclic structure is preferably a structure having four carboxylic acids removed from a tetracarboxylic acid such as 1,2,3,4-cyclobutanetetracarboxylic acid, 2,3,5-tricarboxycyclopentylacetic acid, 3,4-dicarboxy-1,2,3,4-tetrahydro-1-naphthalenesuccinic acid or bicyclo[3,3,0]octane-2,4,6,8-tetracarboxylic acid. The tetravalent organic group having an aliphatic structure is preferably a structure having four carboxylic acids removed from 1,2,3,4-butanetetracarboxylic acid.

Further, when X in the formula (1) is a structure having four carboxylic acids removed from e.g. pyromeritic acid, 3,3',4,4'-biphenyltetracarboxylic acid, 3,3',4,4'-benzophenonetetracarboxylic acid or 1,4,5,8-naphthalenetetracarboxylic acid, although the voltage retention characteristics tend to decrease, there are such effects that the alignment properties of the liquid crystal are excellent, and that accumulation of the charge is further reduced. Accordingly, when improvement in the alignment properties of the liquid crystal and further reduction of accumulation of the charge are important, X may be such a tetravalent organic group, or such a tetravalent organic group may be present as part of X.

In the formula (1), R is a hydrogen atom or an alkyl group and is not particularly limited. Specifically, the alkyl group may, for example, be a methyl group, an ethyl group, a n-propyl group or an iso-propyl group.

The method to obtain the polyimide precursor having a structural unit represented by the formula (1) is not particularly limited. In general, the polyimide precursor (polyamic acid) wherein R in the formula is a hydrogen atom can be obtained by a reaction of a tetracarboxylic dianhydride to constitute X in the formula (1) with a diamine to constitute A in the formula (1), and this method is preferably employed also to obtain the specific polymer a. Further, the polyimide precursor (polyamic acid alkyl ester) wherein R in the formula is an alkyl group can be obtained by dehydration condensation of the above polyamic acid with an alcohol such as methanol, ethanol, 1-propanol or 2-propanol, or by reaction of a tetracarboxylic dianhydride to constitute X in the formula (1) with an alcohol such as methanol, ethanol, 1-propanol or 2-propanol to obtain a tetracarboxylic acid diester, followed by dehydration condensation with a diamine to constitute A in the formula (1).

In order to obtain a polyimide precursor in which a plurality of X's are present in a specific proportion, or in order to obtain a polyimide precursor in which a plurality of A's are present in a specific proportion, tetracarboxylic dianhydrides to constitute X's or diamines to constitute A's each in an aimed proportion are used and reacted. For example, in order that the proportion of A having a nitrogen atom in the polyimide precursor is 10 mol %, the proportion of a diamine to constitute A having a nitrogen atom to the total amount of diamines to be used for preparation of the polyimide precursor should be adjusted to 10 mol %. Likewise, in order that the proportion of X having an alicyclic structure in the polyimide precursor is 20 mol %, the proportion of a tetracarboxylic dianhydride to constitute X having an alicyclic structure to the total amount of tetracarboxylic dianhydrides to be used for preparation of the polyimide precursor should be adjusted to 20 mol %.

Specific examples of the diamine to constitute A in the formula (1) are shown below, but, the diamine is not limited thereto.

As diamines to constitute A having a nitrogen atom, 2,3-diaminopyridine, 2,6-diaminopyridine, 3,4-diaminopyridine, 2,4-diaminopyrimidine, 2,4-diamino-6-hydroxypyrimidine, 2,4-diamino-1,3,5-triazine, 2,4-diamino-1,3,5-triazine, 2,4-diamino-6-isopropoxy-1,3,5-triazine, 2,4-diamino-6-methoxy-1,3,5-triazine, 2,4-diamino-6-phenyl-1,3,5-triazine, 2,6-diaminopurine, 1,4-bis(3-aminopropyl)piperazine, 2,4-diamino-5-phenylthiazole, 3,5-diamino-1,2,4-triazole, 3,6-diaminoacridine, acrinol, 2,5-bis(4-aminophenyl)-1,3,4-oxadiazole, diethylenetriamine, triethylenetetramine, 3,3'-diamino-dipropylamine, pentaethylenehexamine, N,N-bis(3-aminopropyl)methylamine, 4,4'-diaminobenzanilide, 2,6-diamino-4-nitrotoluene, N,N'-bis(4-aminophenyl)-N-phenylamine, N,N'-bis(4-aminophenyl)-N-methylamine and 4,4'-diaminodiphenylurea, may, for example, be mentioned.

As a diamine to constitute A containing one of the structures (6) and (7), a diamine having the following structure (8) or (9) may be mentioned:

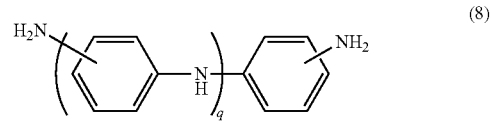

(8)

wherein q is an integer of from 1 to 5,

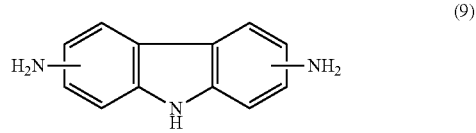

(9)

In the above structures (8) and (9), one or a plurality of optional hydrogen atoms on the benzene rings may be substituted by a monovalent organic group other than a primary amino group. Such a monovalent organic group may, for example, be a $C_{1-20}$ alkyl group, a $C_{2-20}$ alkenyl group, a $C_{1-20}$ alkoxy group, a $C_{1-20}$ fluorine-containing alkyl group, a $C_{2-20}$ fluorine-containing alkenyl group, a $C_{1-20}$ fluorine-containing alkoxy group, a cyclohexyl group, a phenyl group, a fluorine atom or a group comprising a combination thereof. In view of the alignment properties of liquid crystal, it is preferably a monovalent organic group selected from a alkyl group, a $C_{2-4}$ alkenyl group, a $C_{1-4}$ alkoxy group, a $C_{1-4}$ fluorine-containing alkyl group, a $C_{2-4}$ fluorine-containing alkenyl group and a $C_{1-4}$ fluorine-containing alkoxy group. The more preferred structure (8) or (9) is one having no hydrogen atoms on the benzene rings substituted.

The diamine having the structure (8) or (9) is particularly preferably 4,4'-diaminodiphenylamine or 3,6-diaminocarbazole in view of reactivity with a tetracarboxylic dianhydride and the liquid crystal alignment properties when formed into an alignment film.

The diamine mentioned in the above specific examples is preferred as a material to prepare the specific polymer a, and a polyimide precursor having a structural unit represented by the formula (1), prepared by using such a diamine in an amount of preferably from 10 to 100 mol %, more preferably from 60 to 100 mol %, among diamines to be used for the reaction with a tetracarboxylic dianhydride, is preferred as the specific polymer a.

In addition, specific examples of the diamine to constitute A are shown below, but the diamine is not limited thereto.

As examples of an aliphatic diamine, diaminomethane, 1,2-diaminoethane, 1,3-diaminopropane, 1,4-diaminobutane, 1,6-diaminohexane, 1,7-diaminoheptane, 1,8-diaminooctane, 1,9-diaminononane, 1,10-diaminodecane, 1,3-diamino-2,2-dimethylpropane, 1,4-diamino-2,2-dimethylbutane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,11-diaminododecane, 1,12-diaminooctadecane and 1,2-bis(3-aminopropoxy)ethane may be mentioned.

As examples of an alicyclic diamine, 1,4-diaminocyclohexane, 1,3-diaminocyclohexane, 4,4'-diaminodicyclohexylmethane, 4,4'-diamino-3,3'-dimethyldicyclohexylmethane and isophorone diamine may be mentioned.

As examples of a carbon ring type aromatic diamine, o-phenylenediamine, m-phenylenediamine, p-phenylenediamine, a diaminotoluene (such as 2,4-diaminotoluene), 1,4-diamino-2-methoxybenzene, 2,5-diaminoxylene, 1,3-diamino-4-chlorobenzene, 1,4-diamino-2,5-dichlorobenzene, 1,4-diamino-4-isopropylbenzene, 4,4'-diaminodiphenyl-2,2'-propane, 4,4'-diaminodiphenylmethane, 2,2'-diaminostilbene, 4,4'-diaminostilbene, 4,4'-diaminodiphenyl ether, 4,4'-diphenyl thioether, 4,4'-diaminodiphenylsulfone, 3,3'-diaminodiphenylsulfone, phenyl 4,4'-diaminobenzoic acid phenyl ether, 2,2'-diaminobenzophenone, 4,4'-diaminobenzyl, bis(4-aminophenyl)phosphine oxide, bis(3-aminophenyl)methylsulfine oxide, bis(4-aminophenyl)phenylphosphine oxide, bis(4-aminophenyl)cyclohexylphosphine oxide, 1,8-diaminonaphthalene, 1,5-diaminonaphthalene, 1,5-diaminoanthraquinone, diaminofluorene, bis(4-aminophenyl)diethylsilane, bis(4-aminophenyl)dimethylsilane, bis(4-aminophenyl)tetramethyldicyloxane, 3,4'-diaminodiphenyl ether, benzidine, 2,2'-dimethylbenzidine, 2,2-bis[4-(4-aminophenoxy)phenyl]propane, bis[4-(4-aminophenoxy)phenyl]sulfone, 4,4'-bis(4-aminophenoxy)biphenyl, 2,2-bis[4-(4-aminophenoxy)phenyl]hexafluoropropane, 1,4-bis(4-aminophenoxy)benzene and 1,3-bis(4-aminophenoxy)benzene may be mentioned.

As a diamine to constitute A which increases the pretilt angle of liquid crystal, 1-dodecyloxy-2,4-diaminobenzene, 1-hexadecyloxy-2,4-diaminobenzene, 1-octadecyloxy-2,4-diaminobenzene, 1,1-bis(4-aminophenyl)cyclohexane, 2,2-bis[4-(4-aminophenoxy)phenyl]octane, 4,4'-diamino-3-dodecyl diphenyl ether, 4-(4-trans-n-heptylcyclohexylphenoxy)-1,3-diaminobenzene, 4-(4-trans-n-pentylcyclohexylphenoxy)-1,3-diaminobenzene and 4-trans-n-pentylbicyclohexyl-3,5-diaminobenzoate may, for example, be mentioned.

Specific examples of the tetracarboxylic dianhydride to constitute X in the formula (1) are shown below, but the tetracarboxylic dianhydride is not limited thereto.

As a tetracarboxylic dianhydride to constitute X having an alicyclic structure, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,4,5-tetrahydrofurantetracarboxylic dianhydride, 1,2,4,5-cyclohexanetetracarboxylic dianhydride, 2,3,5-tricarboxycyclopentylacetic dianhydride, 3,4-dicarboxy-1-cyclohexylsuccinic dianhydride, 3,4-dicarboxy-1,2,3,4-tetrahydro-1-naphthalenesuccinic dianhydride and bicyclo[3,3,0]octane-2,4,6,8-tetracarboxylic dianhydride may, for example, be mentioned. As a tetracarboxylic dianhydride to constitute X having an aliphatic structure, 1,2,3,4-butanetetracarboxylic dianhydride may, for example, be mentioned. Among them, it is particularly preferred to use at least one tetracarboxylic dianhydride selected from the group consisting of 1,2,3,4-cyclobutanetetracarboxylic dianhydride, 2,3,5-tricarboxycyclopentylacetic dianhydride, 3,4-dicarboxy-1,2,3,4-tetrahydro-1-naphthalenesuccinic dianhydride, bicyclo[3,3,0]octane-2,4,6,8-tetracarboxylic dianhydride and 1,2,3,4-butanetetracarboxylic dianhydride.

Further, as a tetracarboxylic dianhydride to constitute X, aromatic tetracarboxylic dianhydrides such as pyromellitic dianhydride, 3,3',4,4'-biphenyltetracarboxylic dianhydride, 2,2',3,3'-biphenyltetracarboxylic dianhydride, 2,3,3',4'-biphenyltetracarboxylic dianhydride, 3,3',4,4'-benzophenonetetracarboxylic dianhydride, 2,3,3',4'-benzophenonetetracarboxylic dianhydride, bis(3,4-dicarboxyphenyl)ether dianhydride, bis(3,4-dicarboxyphenyl)sulfone dianhydride, 1,2,5,6-naphthalenetetracarboxylic dianhydride, 2,3,6,7-naphthalenetetracarboxylic dianhydride and 1,4,5,8-naphthalenetetracarboxylic dianhydride may be mentioned. When improvement in alignment properties of liquid crystal and further reduction in accumulation of the charge are important, it is preferred to use, among these aromatic tetracarboxylic dianhydrides, at least one tetracarboxylic dianhydride selected from the group consisting of pyromellitic dianhydride, 3,3',4,4'-biphenyltetracarboxylic dianhydride, 3,3',4,4'-benzophenonetetracarboxylic dianhydride and 1,4,5,8-naphthalenetetracarboxylic dianhydride.

Specific Polymer b

The specific polymer b is a polyimide precursor (polyamic acid, polyamic acid alkyl ester) as a high alignment component, or a polyimide as a high alignment component, and is characterized by having a structural unit represented by the formula (2-1) or (2-2). A liquid crystal alignment film having such a structure is excellent in liquid crystal alignment properties and liquid crystal controlling power.

In the formula (2-1) or (2-2), B is a bivalent organic group, and one type or at least two types are present as B, but at least one is required to be a bivalent organic group having any one of structures (3) to (5) in its structure, or a paraphenylene group. The proportion of B having such a specific structure in B in the formula (2-1) or (2-2) is preferably from 10 to 100 mol %, more preferably from 50 to 100 mol %. If this proportion is too low, the liquid crystal alignment properties or the liquid crystal controlling power may deteriorate in some cases. The structure of other B to be present together with B having the above specific structure is not particularly limited. Further, for B, a bivalent organic group having a substituent known to have an effect to increase the tilt angle, such as a long-chain alkyl group, a perfluoroalkyl group or a steroid skeleton group, may be present for the purpose of increasing the pretilt angle of liquid crystal.

In the formula (3), $m_1$ is an integer of from 1 to 18, and in view of the alignment properties and heat resistance of liquid crystal, it is preferably from 1 to 12, more preferably from 2 to 8. Further, it is preferred that the bivalent organic group having the formula (3) in its structure further contains an aromatic ring. The following structures may be mentioned as specific examples, but the structure (3) is not limited thereto.

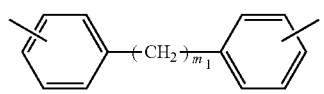
(10)

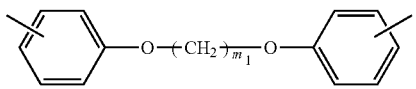
(11)

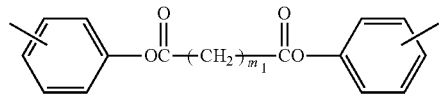
(12)

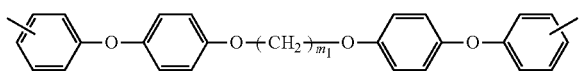
(13)

In the formulae (10) to (13), $m_1$ is an integer of from 1 to 18, preferably from 1 to 12, more preferably from 2 to 8.

In the formula (4), $m_2$ is an integer of from 0 to 8, and in view of voltage retention characteristics, it is preferably from 0 to 3, more preferably from 0 to 2.

In the formula (5), $m_3$ is an integer of from 1 to 4, and in view of stability of a polyimide precursor solution or a polyimide solution, it is preferably 1 or 2.

In the structures of the formulae (4), (5) and (10) to (13) and the paraphenylene group, one or a plurality of optional hydrogen atoms on the benzene ring may be substituted by a monovalent organic group other than a primary amino group. Such a monovalent organic group may, for example, be a $C_{1-20}$ alkyl group, a $C_{2-20}$ alkenyl group, a $C_{1-20}$ alkoxy group, a $C_{1-20}$ fluorine-containing alkyl group, a $C_{2-20}$ fluorine-containing alkenyl group, a $C_{1-20}$ fluorine-containing alkoxy group, a cyclohexyl group, a phenyl group, a fluorine atom or a group comprising a combination thereof. In view of the alignment properties of liquid crystal, it is preferably a monovalent organic group selected from the group consisting of a $C_{1-4}$ alkyl group, a $C_{2-4}$ alkenyl group, a $C_{1-4}$ alkoxy group, a $C_{1-4}$ fluorine-containing alkyl group, a $C_{2-4}$ fluorine-containing alkenyl group and a $C_{1-4}$ fluorine-containing alkoxy group. The more preferred structure is one having no hydrogen atoms on the benzene ring substituted.

Y in the formula (2-1) or (2-2) is a tetravalent organic group, and one type or at least two types may be present. The structure is not particularly limited, but at least one type is preferably a tetravalent organic group having an aromatic structure with a view to further increasing the alignment properties of liquid crystal. In such a case, the proportion of the tetravalent organic group having an aromatic structure in Y is preferably from 20 to 100 mol %, more preferably from 50 to 100 mol %. The tetravalent organic group having an aromatic structure is preferably a structure having four carboxylic acids removed from a tetracarboxylic acid such as pyromellitic acid, 3,3',4,4'-biphenyltetracarboxylic acid, 3,3',4,4'-benzophenonetetracarboxylic acid, bis(3,4-dicarboxyphenyl)ether, bis(3,4-dicarboxyphenyl)sulfone or 2,3,6,7-naphthalenetetracarboxylic acid.

Further, when Y in the formula (2-1) or (2-2) is a structure having four carboxylic acids removed from a tetracarboxylic acid such as 1,2,3,4-cyclobutanetetracarboxylic acid, 2,3,5-tricarboxycyclopentylacetic acid, 3,4-dicarboxy-1,2,3,4-tetrahydro-1-naphthalenesuccinic acid or bicyclo[3,3,0]octane-2,4,6,8-tetracarboxylic acid, although the alignment properties of liquid crystal tend to decrease, there is such an effect that the voltage retention characteristics increase. Accordingly, when the voltage retention is important, Y may be such a tetravalent organic group, or such a tetravalent organic group may be present as part of Y.

R in the formula (2-1) is a hydrogen atom or an alkyl group and is not particularly limited. Specifically, the alkyl group may, for example, be a methyl group, an ethyl group, a n-propyl group or an iso-propyl group.

The method to obtain the polyimide precursor having a structural unit represented by the formula (2-1) is not particularly limited. In general, the polyimide precursor (polyamic acid) wherein R in the formula is a hydrogen atom can be obtained by reaction of a tetracarboxylic dianhydride to constitute Y in the formula (2-1) with a diamine to constitute B in the formula (2-1), and this method can be preferably used also to obtain the specific polymer b. Further, the polyimide precursor (polyamic acid alkyl ester) wherein R in the formula is an alkyl group can be obtained by dehydration concentration of the above polyamic acid with an alcohol such as methanol, ethanol, 1-propanol or 2-propanol, or by reaction of a tetracarboxylic dianhydride to constitute Y in the formula (2-1) with an alcohol such as methanol, ethanol, 1-propanol or 2-propanol to form a tetracarboxylic acid diester, followed by dehydration concentration with a diamine to constitute B in the formula (2-1).

The polyimide having a structural unit represented by the formula (2-2) can be obtained by ring-closure imidation of the polyimide precursor having a structural unit represented by the formula (2-1). Further, the polyimide having a structural unit represented by the formula (2-2) has only to have a structural unit represented by the formula (2-2) in part of the polymer structure, and not all the polyimide precursor structure contained in the polymer structure has to be ring-closure imidated. Namely, a polymer in which both the polyimide precursor structure and the polyimide structure are present is also included.

In order to obtain a polyimide precursor in which a plurality of Y's are present in a specific proportion, or in order to obtain a polyimide precursor in which a plurality of B's are present in a specific proportion, tetracarboxylic dianhydrides to constitute Y or diamines to constitute B each in an aimed proportion are used and reacted. For example, in order that the proportion of B having a specific structure in the polyimide precursor is 10 mol %, the proportion of a diamine to constitute B having a specific structure to the total amount of diamines to be used for preparation of the polyimide precursor should be adjusted to 10 mol %. Likewise, in order that the proportion of Y having an aromatic structure in the polyimide precursor is 20 mol %, the proportion of a tetracarboxylic dianhydride to constitute Y having an aromatic structure to the total amount of tetracarboxylic dianhydrides to be used for preparation of the polyimide precursor should be adjusted to 20 mol %. Further, in order to obtain a polyimide in which a plurality of Y's are present in a specific proportion, or in order to obtain a polyimide in which a plurality of B's are present in a specific proportion, the above polyimide precursor is ring-closure imidated.

Specific examples of the diamine to constitute B in the formula (2-1) or (2-2) are shown below, but the diamine is not limited thereto.

A diamine to constitute B having the structure (3) in its structure may, for example, be 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane or 1,10-diaminodecane. As one further containing an aromatic ring, one corresponding to the formula (10) may, for example, be 1,2-bis(4-aminophenyl)ethane, 1,3-bis(4-aminophenyl)propane, 1,4-bis(4-aminophenyl)butane, 1,5-bis(4-aminophenyl)pentane, 1,6-bis(4-aminophenyl)hexane, 1,7-bis(4-aminophenyl)heptane, 1,8-bis(4-aminophenyl)octane, 1,9-bis(4-aminophenyl)nonane or 1,10-bis(4-aminophenyl)decane. Likewise, one corresponding to the formula (11) may, for example, be 1,2-bis(4-aminophenoxy)ethane, 1,3-bis(4-aminophenoxy)propane, 1,4-bis(4-aminophenoxy)butane, 1,5-bis(4-aminophenoxy)pentane, 1,6-bis(4-aminophenoxy)hexane, 1,7-bis(4-aminophenoxy)heptane, 1,8-bis(4-aminophenoxy)octane, 1,9-bis(4-aminophenoxy)nonane or 1,10-bis(4-aminophenoxy)decane. Likewise, one corresponding to the formula (12) may, for example, be di(4-aminophenyl)ethane-1,2-dioate, di(4-aminophenyl)propane-1,3-dioate, di(4-aminophenyl)butane-1,4-dioate, di(4-aminophenyl)pentane-1,5-dioate, di(4-aminophenyl)hexane-1,6-dioate, di(4-aminophenyl)heptane-1,7-dioate, di(4-aminophenyl)octane-1,8-dioate, di(4-aminophenyl)nonane-1,9-dioate or di(4-aminophenyl)decane-1,10-dioate. Likewise, one corresponding to the formula (13) may, for example, be 1,2-bis[4-(4-aminophenoxy)phenoxy]ethane, 1,3-bis[4-(4-aminophenoxy)phenoxy]propane, 1,4-bis[4-(4-aminophenoxy)phenoxy]butane, 1,5-bis[4-(4-aminophenoxy)phenoxy]pentane, 1,6-bis[4-(4-aminophenoxy)phenoxy]hexane, 1,7-bis[4-(4-aminophenoxy)phenoxy]heptane, 1,8-bis[4-(4-aminophenoxy)phenoxy]octane, 1,9-bis[4-(4-aminophenoxy)phenoxy]nonane or 1,10-bis[4-(4-aminophenoxy)phenoxy]decane.

A diamine to constitute B having the structure (4) in its structure may, for example, be 4,4'-diaminodiphenyl ether, 1,3-bis(4-aminophenoxy)benzene, 1,4-bis(4-aminophenoxy)benzene, 1,3-bis[4-(4-aminophenoxy)phenoxy]benzene or 1,4-bis[4-(4-aminophenoxy)phenoxy]benzene.

A diamine to constitute B having the structure (5) in its structure may, for example, be 4,4'-diaminobenzidine or 4,4'-diamino-p-terphenyl.

A diamine to constitute B which is paraphenylene may, for example, be 1,4-diaminobenzene.

The diamines mentioned in the above specific examples is preferred as a material to prepare the specific polymer b, and a polyamide precursor having a structural unit represented by the formula (2-1), prepared by using such a diamine in an amount of preferably from 10 to 100 mol %, more preferably from 50 to 100 mol %, among diamines to be used for the reaction with a tetracarboxylic dianhydride, or a polyimide having a structural unit represented by the formula (2-2) prepared similarly, is preferred as the specific polymer b.

In addition, specific examples of a diamine to constitute B other than the specific structure are shown below, but the diamine is not limited thereto.

As examples of an alicyclic diamine, 1,4-diaminocyclohexane, 1,3-diaminocyclohexane, 4,4'-diaminodicyclohexylmethane, 4,4'-diamino-3,3'-dimethyldicyclohexylamine and isophoronediamine may be mentioned.

As examples of a carbon ring type aromatic diamine, o-phenylenediamine, m-phenylenediamine, 2,4-diaminotoluene, 1,3-diamino-4-chlorobenzene, 4,4'-diaminodiphenyl-2,2'-propane, 4,4'-diaminodiphenylmethane, 2,2'-diaminostilbene, 4,4'-diaminostilbene, 4,4'-diphenyl thioether, 4,4'-diaminodiphenylsulfone, 3,3'-diaminodiphenylsulfone, 4,4'-diaminobenzoic acid phenyl ester, 2,2'-diaminobenzophenone, 4,4'-diaminobenzyl, bis(4-aminophenyl)phosphine oxide, bis(3-aminophenyl)methylsulfine oxide, bis(4-aminophenyl)phenylphosphine oxide, bis(4-aminophenyl)cyclohexylphosphine oxide, 1,8-diaminonaphthalene, 1,5-diaminonaphthalene, 1,5-diaminoanthraquinone, diaminofluorene, bis(4-aminophenyl)diethylsilane, bis(4-aminophenyl)dimethylsilane, bis(4-aminophenyl)tetramethyldisiloxane, 3,4'-diaminodiphenyl ether, 2,2-bis[4-(4-aminophenoxy)phenyl]propane, bis[4-(4-aminophenoxy)phenyl]sulfone, 2,2-bis[4-(4-aminophenoxy)phenyl]hexafluoropropane, 1,4-bis(4-aminophenoxy)benzene and 1,3-bis(4-aminophenoxy)benzene may be mentioned.

As examples of a diamine containing a nitrogen atom in addition to the two amino groups, 2,4-diaminodiphenylamine, 2,4-diaminopyridine, 2,4-diamino-s-triazine, 2,7-diaminodibenzofuran, 3,7-diaminophenothiazine, 2,5-diamino-1,3,4-thiadiazole, 2,4-diamino-6-phenyl-s-triazine, N,N'-bis(4-aminophenyl)-N-phenylamine, N,N'-bis(4-aminephenyl)-N-methylamine and 4,4'-diaminodiphenylurea may be mentioned.

As examples of a diamine to constitute B to increase the pretilt angle of liquid crystal, 1-dodecyloxy-2,4-diaminobenzene, 1-hexadecyloxy-2,4-diaminobenzene, 1-octadecyloxy-2,4-diaminobenzene, 1,1-bis(4-aminophenyl)cyclohexane, 2,2-bis[4-(4-aminophenoxy)phenyl]octane, 4,4'-diamino-3-dodecyl diphenyl ether, 4-(4-trans-n-heptylcyclohexylphenoxy)-1,3-diaminobenzene, 4-(4-trans-n-pentylcyclohexylphenoxy)-1,3-diaminobenzene and 4-trans-n-pentylbicyclohexyl-3,5-diaminobenzoate may be mentioned.

Preparation of Polyamic Acid

In order to obtain a polyamic acid to be used for the specific polymer a or the specific polymer b by a reaction of a tetracarboxylic dianhydride with a diamine, a simple method is to mix a tetracarboxylic dianhydride and a diamine and allow them to react with each other in an organic solvent.

The organic solvent to be used for the above reaction is not particularly limited so long as it is capable of dissolving the formed polyamic acid. However, specific examples may be N,N-dimethylformamide, N,N-dimethylacetamide, N-methyl-2-pyrrolidone, N-methylcaprolactam, dimethylsulfoxide, tetramethylurea, pyridine, dimethylsulfone, hexamethylsulfoxide and γ-butyrolactone. These solvents may be used alone or as mixed. Further, even a solvent which is incapable of dissolving the polyamic acid may be used as mixed to the above solvent within a range not to precipitate the formed polyamic acid. Further, moisture in the organic solvent tends to impair the polymerization reaction and further may cause hydrolysis of the formed polyamic acid, and therefore, it is preferred to use the organic solvent as dehydrated and dried.

The method for mixing the tetracarboxylic dianhydride component and the diamine component in an organic solvent, may, for example, be a method wherein a solution having the diamine component dispersed or dissolved in an organic solvent, is stirred, and the tetracarboxylic dianhydride component is added as it is or as dispersed or dissolved in an organic solvent, or a method wherein, inversely, the diamine component is added to a solution having the tetracarboxylic dianhydride component dispersed or dissolved in an organic solvent, or a method wherein the tetracarboxylic dianhydride component and the diamine component are alternately added. In the present invention, either one of these methods may be employed. Further, in a case where the tetracarboxylic dianhydride component or the diamine component is made of a plurality of compounds, such a plurality of compounds may be reacted in a preliminarily mixed state or may individually sequentially be reacted.

The temperature at the time of reacting the tetracarboxylic dianhydride component and the diamine component in an organic solvent, is usually from 0 to 150° C., preferably from 5 to 100° C., more preferably from 10 to 80° C. The higher the temperature is, the quicker the polymerization reaction finishes. However, if it is too high, a polymer having a high molecular weight may not sometimes be obtained. Further, the reaction may be carried out at an optional concentration, but if the concentration is too low, it tends to be difficult to obtain a polymer having a high molecular weight, and if the concentration is too high, the viscosity of the reaction solution tends to be too high to carry out uniform stirring. Accordingly, it is preferably from 1 to 50 wt %, more preferably from 5 to 30 wt %. At the initial stage, the reaction may be carried out at a high concentration and then, an organic solvent may be added.

The ratio of the tetracarboxylic dianhydride component: the diamine component, to be used for the polymerization reaction for the polyamic acid is preferably from 1:0.8 to 1.2 by molar ratio. Further, a polyamic acid obtained in excess of the diamine component, may increase coloration of the solution, and thus when too much coloration of the solution is undesirable, the above ratio should be 1:0.8 to 1. Like in a usual polycondensation reaction, the closer the molar ratio to 1:1, the larger the molecular weight of the polyamic acid to be obtained. If the molecular weight of the polyamic acid is too small, the strength of the coated film thereby obtainable may sometimes be inadequate, and inversely, if the molecular weight of the polyamic acid is too large, the solution viscosity of a coating solution obtained from the liquid crystal aligning agent tends to be too high, whereby the operation efficiency at the time of forming a coated film or the uniformity of the coated film tends to be poor. Therefore, the reduced viscosity (at a concentration of 0.5 dl/g in NMP at 30° C.) of the polyamic acid to be used for the liquid crystal aligning agent of the present invention is preferably from 0.1 to 2.0, more preferably from 0.2 to 1.5. From the similar reasons, the reduced viscosity of the polyimide precursor or the polyimide to be used for the liquid crystal aligning agent of the present invention is preferably from 0.1 to 2.0 (at a concentration of 0.5 dl/g in NMP at 30° C.), more preferably from 0.2 to 1.5.

In a case where it is desirable not to have the solvent used for the polymerization of the polyamic acid incorporated in the liquid crystal aligning agent of the present invention or in a case where it is desirable to remove an unreacted monomer component or impurities present in the reaction solution, the polyamic acid is recovered by precipitation and purified. A simple method is to put the polyamic acid solution into a poor solvent under stirring to precipitate and recover the polyamic acid. The poor solvent to be used for the precipitation and recovery of the polyamic acid is not particularly limited, and it may, for example, be methanol, acetone, hexane, butylcellosolve, heptane, methyl ethyl ketone, methyl isobutyl ketone, ethanol, toluene or benzene. The polyamic acid precipitated by being put into the poor solvent, may be recovered by filtration and washing and then dried under atmospheric pressure or reduced pressure at room temperature or under heating, to obtain a powder. The polyamic acid may be purified by repeating an operation of further dissolving this powder in a good solvent, followed by reprecipitation, from 2 to 10 times. In a case where impurities can not be removed by a single operation of recovery by precipitation, it is preferred to carry out such a purification step. It is preferred to use, as the poor solvent, at least three types of poor solvents such as alcohols, ketones or hydrocarbons, since it is thereby possible to further increase the efficiency for purification. The above operation of recovery by precipitation and purification can be similarly carried out for the preparation of a polyamic acid alkyl ester or a polyimide as described hereinafter.

Preparation of Polyamic Acid Alkyl Ester

In order to obtain a polyamic acid alkyl ester to be used for the specific polymer a or the specific polymer b, a simple method is to convert the above-obtained polyamic acid into a form of an acid chloride with e.g. thionyl chloride, and condensing the acid chloride with an alcohol such as methanol, ethanol, 1-propanol or 2-propanol. Another method may, for example, be a method of using a dehydrating agent such as dicyclocarbodiimide to prepare a polyisoimide from the above-obtained polyamic acid, and reacting the polyisoimide with the above alcohol. Otherwise, a tetracarboxylic dianhydride is reacted with an alcohol such as methanol, ethanol, 1-propanol or 2-propanol to obtain a tetracarboxylic acid diester, which is dehydrocondensed with a diamine using a phosphorus condensation agent or a condensation agent such as carbonyl diimidazole.

Preparation of Polyimide

In order to obtain a polyimide to be used for the specific polymer b, a simple method is to subject a polyamic acid having a structural unit represented by the formula (2-1) to cyclodehydration. The imidation reaction is usually thermal imidation wherein the solution of the polyamic acid is heated as it is, or chemical imidation wherein a catalyst is added to the solution of the polyamic acid. However, the chemical imidation wherein the imidation reaction proceeds at a relatively low temperature, is preferred, since decrease in the molecular weight of the polyimide to be obtained, is less likely to occur.

The chemical imidation can be carried out by stirring the polyamic acid in an organic solvent in the presence of a basic catalyst and an acid anhydride. The reaction temperature at that time is usually from −20 to 250° C., preferably from 0 to 180° C., and the reaction time may be from 1 to 100 hours. The amount of the basic catalyst is from 0.5 to 30 mols, preferably from 2 to 20 mols, per mol of the amic acid groups, and the amount of the acid anhydride is from 1 to 50 mols, preferably from 3 to 30 mols, per mol of amic acid groups. If the amount of the basic catalyst or the acid anhydride is too small, the reaction may not adequately proceed, and if it is too much, it tends to be difficult to completely remove it after completion of the reaction. As the basic catalyst to be used at that time, pyridine, triethylamine, trimethylamine, tributylamine or trioctylamine may, for example, be mentioned, and among them, pyridine is preferred since it has a proper basicity to let the reaction proceed. Whereas, as the acid anhydride, acetic anhydride, trimellitic anhydride or pyromellitic anhydride may, for example, be mentioned, and among them, it is preferred to employ acetic anhydride, whereby purification after completion of the reaction will be easy. As the organic solvent, the above-described solvent to be used for the preparation of the polyamic acid, may be used. The imidation rate by the chemical imidation may be controlled by adjusting the amount of the catalyst and the reaction temperature or the reaction time.

In a polyimide solution thus obtained, the added catalyst still remains in the solution. Accordingly, in order to use it for the liquid crystal aligning agent of the present invention, it is preferred to precipitate and recover the polymer as described in the preparation of the polyamic acid. The poor solvent and the operation to be used for precipitation and recovery of the polyimide are as described above.

Liquid Crystal Aligning Agent

The liquid crystal aligning agent of the present invention explained below has a form of a coating liquid containing the specific polymer a and the specific polymer b, but may have another form so long as a uniform thin film can be formed on a substrate.

In order to obtain a coating liquid containing the specific polymer a and the specific polymer b, reaction solutions of the respective specific polymers may be mixed as they are, the specific polymers in solid forms may be dissolved in organic solvents and then mixed, or the specific polymers in solid forms may be mixed while being dissolved in organic solvents.

Such an organic solvent is not particularly limited so long as it is capable of dissolving the resin component to be contained, but specific examples thereof may be N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethylsulfone, hexamethylsulfoxide and γ-butyrolactone. These solvents may be used alone or in combination as a mixture of a plurality of them.

Further, even a solvent which is incapable of dissolving the resin component alone may be mixed to the liquid crystal aligning agent of the present invention within a range not to let the resin component precipitate. Especially, it has been known that the uniformity of the coated film at the time of coating on the substrate improves by properly mixing a solvent having a low surface tension, such as ethylcellosolve, butylcellosolve, ethylcarbitol, butylcarbitol, ethylcarbitol acetate, ethylene glycol, 1-methoxy-2-propanol, 1-ethoxy-2-propanol, 1-butoxy-2-propanol, 1-phenoxy-2-propanol, propylene glycol monoacetate, propylene glycol diacetate, propylene glycol-1-monomethyl ether-2-acetate, propylene glycol-1-monoethyl ether-2-acetate, dipropylene glycol, 2-(2-ethoxypropoxy)propanol, lactic acid methyl ester, lactic acid ethyl ester, lactic acid n-propyl ester, lactic acid n-butyl ester or lactic acid isoamyl ester, and such an organic solvent is suitably used also for the liquid crystal aligning agent of the present invention.

The solid content concentration in the coating liquid as the liquid crystal aligning agent of the present invention may suitably be changed depending upon the setting of the thickness of the liquid crystal alignment film to be formed, but it is preferably from 1 to 10 wt %. If it is less than 1 wt %, it tends to be difficult to form a coated film which is uniform and flawless, and if it is higher than 10 wt %, the storage stability of the solution may sometimes be poor.

Further, to the liquid crystal aligning agent of the present invention, in order to improve the adhesion of the coated film to the substrate, an additive such as a silane coupling agent may be added, or other resin component may be incorporated.

The liquid crystal aligning agent of the present invention obtained as described above, is subjected to filtration as the case requires, and then applied to a substrate, followed by drying and baking to form a coated film, and this coated film surface is subjected to alignment treatment such as rubbing or irradiation with light, so that it may be used as a liquid crystal alignment film.

As the substrate to be used at that time is not particularly limited so long as it is a highly transparent substrate, and it is possible to employ a glass substrate or a plastic substrate such as an acrylic substrate or a polycarbonate substrate. It is preferred to employ a substrate having ITO electrodes, etc. formed for liquid crystal driving with a view to simplification of the process. Further, in the case of a reflection type liquid crystal display device, an opaque material such as a silicon wafer may be used for a substrate for one side, and for the electrodes in such a case may be made of a material which reflects lights, such as aluminum.

As the method for applying the liquid crystal aligning agent, a spin coating method, a printing method or an inkjet method may, for example, be mentioned. However, from the viewpoint of the productivity, a transfer printing method is industrially widely employed, and it may suitably be employed also for the liquid crystal aligning agent of the present invention.

The step of drying after application of the liquid crystal aligning agent is not necessarily required, but it is preferred to include a drying step in a case where the time after the application to the baking is not constant for every substrate or in a case where baking is not immediately carried out after the application. Such drying may be carried out until the solvent is evaporated to such an extent that the coated film shape will not be deformed by e.g. transportation of the substrate. The drying means is not particularly limited. As a specific example, a method may be employed wherein drying is carried out for from 0.5 to 30 minutes, preferably from 1 to 5 minutes, on a hot plate of from 50 to 150° C., preferably from 80 to 120° C.

The baking of the liquid crystal aligning agent can be carried out at an optional temperature of from 100 to 350° C., preferably from 150 to 300° C., further preferably from 200 to 250° C. In a case where a polyimide precursor is incorporated into the liquid crystal aligning agent, the conversion rate from the polyimide precursor to the polyimide may change depending upon this baking temperature, but the liquid crystal aligning agent of the present invention is not required to be imidated 100%. However, it is preferred to carry out baking at a temperature higher by at least 10° C. than the heat treatment temperature such as curing of a sealing agent, which is required in the step of producing a liquid crystal cell.

The thickness of the coated film after baking is from 5 to 300 nm, preferably from 10 to 100 nm, since if it is too thick, such will be disadvantageous from the viewpoint of the power consumption of the liquid crystal display device, and if it is too thin, the reliability of the liquid crystal display device may sometimes decrease.

The liquid crystal alignment film obtained from the liquid crystal aligning agent of the present invention as mentioned above, has excellent characteristics and thus can be used as a liquid crystal alignment film for e.g. TN, STN, TFT, VA or in-plane switching liquid crystal display devices and further for ferroelectric or antiferroelectric liquid crystal display devices. Particularly, it is suitably used as a liquid crystal alignment film for an in-plane switching liquid crystal display device which is susceptible to image persistence due to the alignment controlling power.

Liquid Crystal Display Device

The liquid crystal display device of the present invention is one prepared in such a manner that a substrate provided with a liquid crystal alignment film is obtained from the liquid crystal aligning agent of the present invention by the above-described method, and then a liquid crystal cell is prepared by a known method to obtain a liquid crystal display device. As an example for the preparation of a liquid crystal cell, a method is common wherein a pair of substrates having liquid crystal alignment films formed thereon are placed with a spacer of from 1 to 30 μm, preferably from 2 to 10 μm, interposed therebetween, so that the rubbing directions will be at an optional angle of from 0 to 270°, their periphery is fixed by a sealing agent, then liquid crystal is injected, followed by sealing. The method for sealing liquid crystal is not particularly limited, and it may, for example, be a vacuum method wherein liquid crystal is injected after reducing the pressure in the liquid crystal cell thus prepared, or a dropping method wherein liquid crystal is dropped, followed by sealing.

The liquid crystal display device prepared by using the liquid crystal aligning agent of the present invention in such a manner, is excellent in the alignment properties of liquid crystal and alignment controlling power and has excellent electrical characteristics, and thus can be made to be a liquid crystal display device which is less susceptible to lowering of contrast or to image persistence. Thus, it is suitably employed for display devices of various systems employing nematic liquid crystal, such as TN, STN, TFT, VA and in-plane switching liquid crystal display devices. Further, by selecting the liquid crystal to be used, it may be used also for ferroelectric and antiferroelectric liquid crystal display devices. It is particularly preferably used for an in-plane switching liquid crystal display device which is susceptible to image persistence due to the alignment controlling power, among such liquid crystal display devices.

Now, the present invention will be described in further detail with reference to Examples. However, it should be understood that the present invention is by no means restricted to such specific Examples.

EXAMPLES

Explanation of Abbreviations Used in the Present Examples

Tetracarboxylic Dianhydrides
 TC-1: 1,2,3,4-cyclobutanetetracarboxylic dianhydride
 TC-2: 3,4-dicarboxy-1,2,3,4-tetrahydro-1-naphthalene-succinic dianhydride
 TC-3: 1,2,3,4-butanetetracarboxylic dianhydride
 TC-4: bicyclo[3,3,0]octane-2,4,6,8-tetracarboxylic dianhydride
 TC-5: pyromellitic dianhydride
Diamines
 DA-1: 4,4'-diaminodiphenylamine
 DA-2: 3,6-diaminocarbazole
 DA-3: 4,4'-diaminodiphenylmethane
 DA-4: 1,3-bis(4-aminophenoxy)benzene
 DA-5: di(4-aminophenyl)butane-1,4-dioate
 DA-6: 1,5-bis(4-aminophenoxy)pentane
 DA-7: 1,8-bis(4-aminophenoxy)octane
 DA-8: 1,5-bis[4-(4-aminophenoxy)phenoxy]pentane
 DA-9: 1,6-bis[4-(4-aminophenoxy)phenoxy]hexane
 DA-10: 4,4'-diamino-p-terphenyl
 DA-11: paraphenylenediamine
 DA-12: 4,4'-diaminodiphenyl ether
 DA-13: 1,3-diamino-4-octadecyloxybenzene
Organic Solvents
 NMP: N-methyl-2-pyrrolidone
 GBL: γ-butyrolactone
 BCS: butyl cellosolve Preparation Examples Preparation of Specific Polymer a Preparation Example 1

18.73 g (0.094 mol) of TC-1 and 19.61 g (0.1 mol) of DA-1 were mixed in 345.1 g of NMP and reacted for 5 hours at room temperature to obtain a polyamic acid solution comprising TC-1/DA-1. The polymerization reaction proceeded easily and uniformly, and the reduced viscosity of the obtained polyamic acid was 1.18 dl/g (at a concentration of 0.5 g/dl, in NMP at 30° C.). Further, this solution was diluted so that it comprised 5 wt % of the polyamic acid, 75 wt % of NMP and 20 wt % of BCS, to obtain a polyamic acid solution (PA-a1).

This polyamic acid solution (PA-a1) was spin-coated on a glass substrate provided with ITO transparent electrodes, dried for 5 minutes on a hotplate of 80° C. and then baked for 30 minutes in a hot air circulation oven at 220° C. to form a coated film having a thickness of 1 μm. Then, aluminum was deposited on the surface of the coated film to form an upper electrode (electrode area 0.0707 cm$^2$). A voltage of 10 V was applied between the ITO electrode and the aluminum electrode, and the volume resistivity was calculated from the electric current after 60 seconds. As a result, it was 3×10$^{12}$ Ωcm.

Preparation Examples 2 to 11

In the same manner as in Preparation Example 1, a tetracarboxylic dianhydride and a diamine were mixed in NMP and reacted for from 5 to 24 hours at room temperature, and the obtained solution was diluted with NMP and BCS so that the solution comprised 5 wt % of a polyamic acid, 75 wt % of NMP and 20 wt % of BCS, to obtain a polyamic acid solution (PA-a2 to PA-a11). The materials used, and the reduced viscosity and the volume resistivity of the obtained polyamic acids, including Preparation Example 1, are shown below. The numbers in the brackets represent copolymerization rates.

PA-a1: 1.18 dl/g, 3×10$^{12}$ Ωcm, TC-1/DA-1
PA-a2: 1.08 dl/g, 3×10$^{12}$ Ωcm, TC-2/DA-1
PA-a3: 0.62 dl/g, 3×10$^{12}$ Ωcm, TC-3/DA-1
PA-a4: 0.68 dl/g, 2×10$^{12}$ Ωcm, TC-4/DA-1
PA-a5: 1.31 dl/g, 2×10$^{12}$ Ωcm, TC-5/DA-1
PA-a6: 1.28 dl/g, 3×10$^{12}$ Ωcm, TC-1/DA-2
PA-a7: 1.08 dl/g, 4×10$^{13}$ Ωcm, TC-1/DA-1(60), DA-3(40)
PA-a8: 0.95 dl/g, 3×10$^{12}$ Ωcm, TC-1(50), TC-5(50)/DA-1
PA-a9: 1.31 dl/g, 7×10$^{12}$ Ωcm, TC-1(80), TC-2(20)/DA-1(80), DA-3(20)
PA-a10: 1.25 dl/g, 4×10$^{13}$ Ωcm, TC-1(80), TC-2(20)/DA-1(60), DA-3(40)
PA-a11: 1.05 dl/g, 2×10$^{13}$ Ωcm, TC-1/DA-1(50), DA-4(50)

Preparation of Specific Polymer b

Preparation Example 12

20.07 g (0.092 mol) of TC-5 and 29.23 g (0.1 mol) of DA-4 were mixed in 443.7 g of NMP and reacted for 5 hours at room temperature to obtain a polyamic acid solution comprising TC-5/DA-4. The polymerization reaction proceeded easily and uniformly, and the reduced viscosity of the obtained polyamic acid was 0.92 dl/g (at a concentration of 0.5 g/dl, in NMP at 30° C.). Further, this solution was diluted so that it comprised 5 wt % of the polyamic acid, 75 wt % of NMP and 20 wt % of BCS, to obtain a polyamic acid solution (PA-b1).

Preparation Examples 13 to 24

In the same manner as in Preparation Example 12, a tetracarboxylic dianhydride and a diamine were mixed in NMP and reacted for from 5 to 24 hours at room temperature, and the obtained solution was diluted with NMP and BCS so that the solution comprised 5 wt % of a polyamic acid, 75 wt % of NMP and 20 wt % of BCS, to obtain a polyamic acid solution (PA-b2 to PA-b12). The materials used, and the reduced viscosity of the obtained polyamic acids, including Preparation Example 12, are shown below. The numbers in the brackets represent copolymerization rates.

PA-b1: 0.92 dl/g, TC-5/DA-4
PA-b2: 1.02 dl/g, TC-5/DA-5
PA-b3: 1.15 dl/g, TC-5/DA-6
PA-b4: 1.07 dl/g, TC-1/DA-6
PA-b5: 0.87 dl/g, TC-1/DA-7
PA-b6: 1.02 dl/g, TC-1/DA-8
PA-b7: 1.00 dl/g, TC-1/DA-9
PA-b8: 1.20 dl/g, TC-1/DA-10
PA-b9: 0.70 dl/g, TC-1/DA-11
PA-b10: 0.69 dl/g, TC-1/DA-6(10), DA-3(90)
PA-b11: 1.04 dl/g, TC-5/DA-6(50), DA-12(50)
PA-b12: 1.05 dl/g, TC-1(50), TC-5(50)/DA-6

Preparation Example 25

29.77 g (0.099 mol) of TC-2 and 28.64 g (0.1 mol) of DA-6 were mixed in 330.7 g of NMP and reacted for 5 hours at room temperature to obtain a polyamic acid solution. 100 g of this polyamic acid solution was diluted with NMP to 5 wt %, and 26.1 g of acetic anhydride and 12.1 g of pyridine were added as imidation catalysts and reacted for 3 hours at 40° C. This reaction solution was put into 1.2 L of methanol, and the obtained precipitate was collected by filtration, thoroughly washed with methanol and then dried under reduced pressure at 100° C. to obtain a white polyimide powder. The reduced viscosity of the obtained polyimide was 0.9 dl/g. 5 g of this powder was dissolved in 80 g of GBL and 15 g of BCS, to obtain a polyimide solution (PI-b13).

Preparation Example 26

29.77 g (0.099 mol) of TC-2, 8.65 g (0.08 mol) of DA-11 and 7.53 g (0.02 mol) of DA-13 were mixed in 260.2 g of NMP and reacted for 10 hours at room temperature to obtain a polyamic acid solution. 100 g of this polyamic acid solution was diluted with NMP to 5 wt %, and 24.6 g of acetic anhydride and 11.4 g of pyridine were added as imidation catalysts and reacted for 3 hours at 40° C. This reaction solution was put into 1.2 L of methanol, and the obtained precipitate was collected by filtration, thoroughly washed with methanol and then dried under reduced pressure at 100° C. to obtain a white polyimide powder. The reduced viscosity of the obtained polyimide was 0.7 dl/g. 5 g of this powder was dissolved in 80 g of GBL and 15 g of BCS, to obtain a polyimide solution (PI-b14).

Preparation Example 27

18.63 g (0.095 mol) of TC-1 and 19.83 g (0.1 mol) of DA-3 were mixed in 217.9 g of NMP and reacted for 8 hours at room temperature to obtain a polyamic acid solution. The polymerization reaction proceeded easily and uniformly, and the reduced viscosity of the obtained polyamic acid was 1.00 dl/g (at a concentration of 0.5 g/dl, in NMP at 30° C.). Further, this solution was diluted so that it comprised 5 wt % of the polyamic acid, 75 wt % of NMP and 20 wt % of BCS, to obtain a polyamic acid solution (PA-1). The volume resistivity of the polyamic acid was measured in the same manner as in Preparation Example 1, whereupon it was $2 \times 10^{14}$ Ωcm.

Example 1

The polyamic acid solutions (PA-a1) and (PA-b1) obtained in Preparation Examples were mixed in a weight ratio of 80/20 to obtain a liquid crystal aligning agent of the present invention.

Using this liquid crystal aligning agent, the rubbing resistance, the voltage retention characteristics, the charge accumulation characteristics, the liquid crystal alignment properties and the alignment controlling power were evaluated.

Evaluation of Rubbing Resistance (Scratches by Rubbing, Scrapes by Rubbing)

The liquid crystal aligning agent was spin-coated on a glass substrate provided with ITO transparent electrodes, dried for 5 minutes on a hotplate of 80° C. and then baked for 30 minutes in a hot air circulation oven at 220° C. to form a coated film having a thickness of 100 nm. This coated surface was subjected to rubbing by means of a rayon cloth by a rubbing apparatus having a roll diameter of 120 mm under conditions of a roll rotational speed of 300 rpm, a roll advancing speed of 20 mm/sec and a pushing amount of 0.5 mm, to obtain a substrate provided with a liquid crystal alignment film.

The rubbed surface of this substrate provided with a liquid crystal alignment film was observed by a confocal laser microscope, and presence or absence of scratches on the film surface and adhesion of fragments formed by scraping was confirmed. Observation by a confocal laser microscope was carried out at a scale of 10 magnifications.

Evaluation of Voltage Retention Characteristics (Voltage Retention)

The liquid crystal aligning agent was spin-coated on a glass substrate provided with ITO transparent electrodes, dried for 5 minutes on a hotplate of 80° C. and then baked for 30 minutes in a hot air circulation oven at 220° C. to form a coated film having a thickness of 100 nm. This coated surface was subjected to rubbing by means of a rayon cloth by a rubbing apparatus having a roll diameter of 120 mm under conditions of a roll rotational speed of 300 rpm, a roll advancing speed of 20 mm/sec and a pushing amount of 0.5 mm, to obtain a substrate provided with a liquid crystal alignment film.

Two sheets of such a substrate provided with a liquid crystal alignment film were prepared, a spacer of 6 μm was sprayed on the liquid crystal alignment film surface of one sheet, and then a sealing agent was printed thereon, and the other substrate was bonded so that the liquid crystal alignment film surfaces faced each other and that the rubbing directions were at right angles, and then, the sealing agent was cured to prepare a void cell. To this void cell, liquid crystal MLC-2003 (manufactured by Merck Japan Limited) was injected by a reduced pressure injection method, and the injection inlet was sealed to obtain a twisted nematic liquid crystal cell.

To this twisted nematic liquid crystal cell, a voltage of 4 V was applied for 60 μs at a temperature of 23° C., and the voltage after 16.67 ms was measured, whereby to what extent the voltage was maintained, was calculated as a voltage retention. Further, the same measurement was carried out also at a temperature of 90° C.

Evaluation of Charge Accumulation Characteristics (Residual Voltage after Application of DC Voltage)

Rectangular waves of ±3 V/30 Hz having a DC voltage of 3 V superimposed, were applied to the twisted nematic liquid crystal cell, the voltage retention characteristics of which were measured, and the residual voltage remaining in the liquid crystal cell immediately after switching off the DC 3 V was measured by an optical flicker elimination method.

Evaluation of Liquid Crystal Alignment Properties (Initial Alignment of Antiparallel Liquid Crystal Cell)

The liquid crystal aligning agent was spin-coated on a glass substrate provided with ITO transparent electrodes, dried for 5 minutes on a hotplate of 80° C. and then baked for 30 minutes in a hot air circulation oven at 220° C. to form a coated film having a thickness of 100 nm. This coated surface was subjected to rubbing by means of a rayon cloth by a rubbing apparatus having a roll diameter of 120 mm under conditions of a roll rotational speed of 800 rpm, a roll advancing speed of 10 mm/sec and a pushing amount of 0.8 mm, to obtain a substrate provided with a liquid crystal alignment film.

Two sheets of such a substrate provided with a liquid crystal alignment film were prepared, a spacer of 6 μm was sprayed on the liquid crystal alignment film surface of one sheet, and then a sealing agent was printed thereon, and the other substrate was bonded so that the liquid crystal alignment film surfaces faced each other and that the rubbing directions made an angle of 180°, and then, the sealing agent was cured to prepare a void cell. To this void cell, liquid crystal MLC-2003 (manufactured by Merck Japan Limited) was injected by a reduced pressure injection method, and the injection inlet was sealed to obtain an antiparallel liquid crystal cell.

This antiparallel liquid crystal cell was interposed between two polarizing plates which were superposed so that the polarization directions intersected with each other, and the alignment state of the liquid crystal was visually observed.

Evaluation of Alignment Controlling Power (AC Driving Image Persistence of In-Plane Switching Cell)

A liquid crystal aligning agent was spin-coated on a glass substrate having a two pixel (about 1 cm² per pixel) in-plane switching comb electrode (Cr electrode: electrode width 20 μm, electrode distance 20 mm, electrode height 120 nm) as shown in FIG. 1. The liquid crystal aligning agent was dried for 5 minutes on a hotplate of 80° C. and then baked for 30 minutes in a hot air circulation oven at 220° C. to form a coated film having a thickness of 100 nm. This coated surface was subjected to rubbing by means of a rayon cloth by a rubbing apparatus having a roll diameter of 120 mm under conditions of a roll rotational speed of 300 rpm, a roll advancing speed of 20 mm/sec and a pushing amount of 0.5 mm. The rubbing direction was adjusted to make an angle of 15° with the direction of the teeth of the comb. Further, a coated film was formed in the same manner as on a glass substrate having no electrode formed thereon as a counter substrate, and the coated surface was subjected to rubbing. The rubbing direction on the glass substrate having no electrode was adjusted so that after the substrate was bonded to the substrate provided with a comb electrode, the respective rubbing directions made an angle of 0°.

The above two substrates were employed as a pair, a spacer of 6 μm was sprayed on a liquid crystal alignment film surface of one sheet, and then a sealing agent was printed thereon, and the other substrate was bonded so that the liquid crystal alignment film faces faced each other and that the rubbing directions made an angle of 0°, whereupon the sealing agent was cured to prepare a void cell. To this void cell, liquid crystal MLC-2042 (manufactured by Merck Japan Limited) was injected by a reduced pressure injection method, and the injection inlet was sealed to obtain an in-plane switching liquid crystal cell.

Rectangular waves of ±30 V/30 Hz were applied only to one pixel of the in-plane switching liquid crystal cell at a temperature of 60° C. for 3 hours. The liquid crystal cell after the voltage was turned off was cooled by air from the fan at room temperature of 23° C. About 10 minutes later, the liquid crystal cell which was cooled almost to room temperature was interposed between two polarizing plates which were superposed so that the polarization directions intersected with each other, and the contrast between the pixel to which a voltage was applied and the pixel to which no voltage was applied was visually confirmed. One without difference in color tone between both pixels was rated to have good alignment controlling power.

Evaluation Results

Results of the above evaluations are shown below.

Rubbing resistance: No scratches nor fragments formed by scraping were observed on the surface of the alignment film after rubbing.

Voltage retention characteristics: The voltage retention was 99.0% at 23° C. and 85.9% at 90° C.

Charge accumulation characteristics: The residual voltage was 0 V.

Liquid crystal alignment properties: Good. The liquid crystal was uniformly aligned without flaws.

Alignment controlling power: Good. No difference was observed between the pixel to which a voltage was applied and the pixel to which no voltage was applied.

Examples 2 to 19

The polyamic acid solution and the polyimide solution obtained in Preparation Examples were mixed in the following proportion to obtain a liquid crystal aligning agent of the present invention. Using the liquid crystal aligning agent, evaluations were carried out in the same manner as in Example 1. The results are shown in Table 1 as described hereinafter.

Example 2: (PA-a1)/(PA-b5)=70/30
Example 3: (PA-a1)/(PA-b6)=70/30
Example 4: (PA-a1)/(PA-b9)=80/20
Example 5: (PA-a1)/(PA-b11)=80/20
Example 6: (PA-a1)/(PA-b12)=70/30
Example 7: (PA-a2)/(PA-b7)=70/30
Example 8: (PA-a3)/(PA-b8)=70/30

Example 9: (PA-a4)/(PA-b4)=80/20
Example 10: (PA-a5)/(PA-b10)=90/10
Example 11: (PA-a6)/(PA-b3)=80/20
Example 12: (PA-a6)/(PA-b4)=80/20
Example 13: (PA-a7)/(PA-b4)=80/20
Example 14: (PA-a8)/(PA-b2)=90/10
Example 15: (PA-a9)/(PA-b3)=80/20
Example 16: (PA-a10)/(PA-b4)=60/40
Example 17: (PA-a11)/(PA-b9)=70/30
Example 18: (PA-a9)/(PI-b13)=80/20
Example 19: (PA-a9)/(PI-b14)=80/20

TABLE 1

|  | Voltage retention (%) | | Residual voltage (V) | Alignment properties | Alignment controlling power | Scratched or fragments by rubbing |
| --- | --- | --- | --- | --- | --- | --- |
|  | 23° C. | 90° C. |  |  |  |  |
| Ex. 1 | 99.0 | 85.9 | 0 | Good | Good | Nil |
| Ex. 2 | 98.8 | 88.5 | 0 | Good | Good | Nil |
| Ex. 3 | 98.9 | 90.2 | 0 | Good | Good | Nil |
| Ex. 4 | 99.0 | 87.0 | 0 | Good | Good | Nil |
| Ex. 5 | 99.3 | 88.5 | 0 | Good | Good | Nil |
| Ex. 6 | 99.3 | 91.4 | 0 | Good | Good | Nil |
| Ex. 7 | 99.2 | 90.3 | 0 | Good | Good | Nil |
| Ex. 8 | 99.2 | 92.1 | 0 | Good | Good | Nil |
| Ex. 9 | 98.6 | 90.1 | 0 | Good | Good | Nil |
| Ex. 10 | 99.3 | 88.5 | 0 | Good | Good | Nil |
| Ex. 11 | 99.0 | 90.7 | 0 | Good | Good | Nil |
| Ex. 12 | 98.9 | 89.1 | 0 | Good | Good | Nil |
| Ex. 13 | 99.1 | 87.3 | 0 | Good | Good | Nil |
| Ex. 14 | 99.3 | 90.6 | 0 | Good | Good | Nil |
| Ex. 15 | 98.6 | 84.8 | 0 | Good | Good | Nil |
| Ex. 16 | 99.1 | 85.2 | 0 | Good | Good | Nil |
| Ex. 17 | 99.0 | 85.0 | 0 | Good | Good | Nil |
| Ex. 18 | 99.1 | 86.2 | 0 | Good | Good | Nil |
| Ex. 19 | 99.3 | 91.7 | 0 | Good | Good | Nil |

Comparative Example 1

The polyamic acid solutions (PA-a1) and (PA-1) obtained in Preparation Examples were mixed in a weight ratio of 80/20 to obtain a liquid crystal aligning agent for comparison.

Using this liquid crystal aligning agent, the rubbing resistance, the voltage retention characteristics, the charge accumulation characteristics, the liquid crystal alignment properties and the alignment controlling power were evaluated in the same manner as in Example 1. The results are shown below.

Rubbing resistance: No scratches nor fragments by scraping were observed on the surface of the alignment film after rubbing.

Voltage retention characteristics: The voltage retention was 99.2% at 23° C. and 91.0% at 90° C.

Charge accumulation characteristics: The residual voltage was 0 V.

Liquid crystal alignment properties: Flow alignment was formed in the form of a fan along the liquid crystal injection direction, and the liquid crystal was not uniformly aligned.

Alignment controlling power: A clear contrast was observed between the pixel to which a voltage was applied and the pixel to which no voltage was applied, and the liquid crystal at the pixel to which a voltage was applied was confirmed not to recover to the original alignment state.

Comparative Example 2

The polyamic acid solutions (PA-1) and (PA-b4) obtained in Preparation Examples were mixed in a weight ratio of 80/20 to obtain a liquid crystal aligning agent for comparison.

Using this liquid crystal aligning agent, the rubbing resistance, the voltage retention characteristics, the charge accumulation characteristics, the liquid crystal alignment properties and the alignment controlling power were evaluated in the same manner as in Example 1. The results are shown below.

Rubbing resistance: Significant scratches and fragments by scraping were observed on the surface of the alignment film after rubbing.

Voltage retention characteristics: The voltage retention was 98.9% at 23° C. and 88.2% at 90° C.

Charge accumulation characteristics: The residual voltage was so high as 1.7 V.

Liquid crystal alignment properties: The liquid crystal was uniformly aligned without flaws.

Alignment controlling power: No difference was observed between the pixel to which a voltage was applied and the pixel to which no voltage was applied.

INDUSTRIAL APPLICABILITY

By using the liquid crystal aligning agent of the present invention, a liquid crystal alignment film excellent in liquid crystal alignment properties, alignment controlling power and rubbing resistance, having high voltage retention characteristics and having reduced charge accumulation, can be obtained. Further, a liquid crystal display device having a liquid crystal alignment film obtained from the liquid crystal aligning agent of the present invention is excellent in alignment properties of liquid crystal and alignment controlling power, and has excellent electrical characteristics, whereby it can be made to be a liquid crystal display device which is less susceptible to lowering of contrast or to image persistence.

The invention claimed is:

1. A liquid crystal display device having a liquid crystal alignment film,
wherein the liquid crystal alignment film is obtained by subjecting a liquid crystal alignment agent to a rubbing treatment,
wherein the liquid crystal alignment agent comprises a polyimide precursor consisting of atoms of carbon, nitrogen, oxygen and hydrogen and having a structural unit represented by the formula (1) and having a volume resistivity of from $1 \times 10^{10}$ to $1 \times 10^{14}$ Ωcm when formed into a film, and a polyimide precursor having a structural unit represented by the formula (2-1) or a polyimide having a structural unit represented by the formula (2-2):

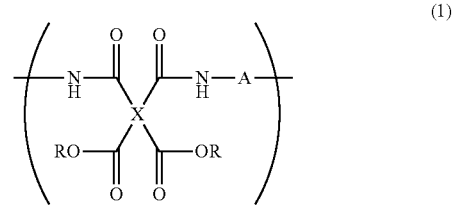

wherein formula (1), R represents a hydrogen atom or an alkyl group, X represents a tetravalent organic group, and A represents a bivalent organic group, wherein from 10 to 100 mol % of A in formula (1) is a bivalent organic group having the following structure (6):

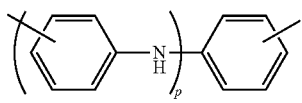
(6)

wherein formula (6), p is 1,

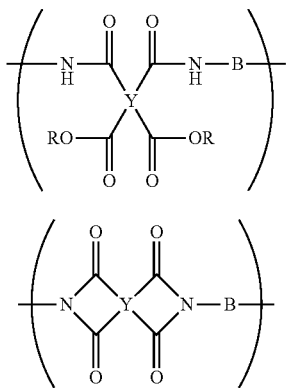
(2-1)
(2-2)

wherein formulae (2-1) and (2-2), R represents a hydrogen atom or an alkyl group, Y represents a tetravalent organic group, B represents a bivalent organic group, and from 10 to 100 mol % of B is a bivalent organic group having any one of the following structures (3) to (5) in its structure, or a paraphenylene group:

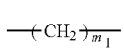
(3)

wherein formula (3), $m_1$ is an integer of from 2 to 18,

(4)

wherein formula (4), one or a plurality of optional hydrogen atoms on the benzene rings may be substituted by a monovalent organic group other than a primary amino group, and $m_2$ is an integer of from 1 to 8,

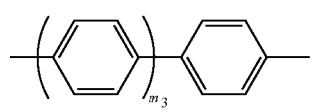
(5)

wherein formula (5), one or a plurality of optional hydrogen atoms on the benzene rings may be substituted by a monovalent organic group other than a primary amino group, and $m_3$ is an integer of from 1 to 4.

2. The liquid crystal display device according to claim 1, wherein from 20 to 100 mol % of X in the formula (1) is a tetravalent organic group having an alicyclic structure or a tetravalent organic group having an aliphatic structure.

3. The liquid crystal display device according to claim 1, wherein the polyimide precursor having a structural unit represented by the formula (1) is contained in an amount of from 10 to 95 wt % based on the total amount of said polyamide precursor and the polyimide precursor having a structural unit represented by the formula (2-1) or the polyimide having a structural unit represented by the formula (2-2).

4. The liquid crystal display device according to claim 2, wherein from 20 to 100 mol % of Y in the formula (2-1) or (2-2) is a tetravalent organic group having an aromatic structure.

5. The liquid crystal display device according to claim 2, wherein the polyimide precursor having a structural unit represented by the formula (1) is contained in an amount of from 10 to 95 wt % based on the total amount of said polyamide precursor and the polyimide precursor having a structural unit represented by the formula (2-1) or the polyimide having a structural unit represented by the formula (2-2).

6. The liquid crystal display device according to claim 3, wherein from 20 to 100 mol % of Y in the formula (2-1) or (2-2) is a tetravalent or organic group having an aromatic structure.

7. The liquid crystal display device according to claim 4, wherein the polyimide precursor having a structural unit represented by the formula (1) is contained in an amount of from 10 to 95 wt % based on the total amount of said polyamide precursor and the polyimide precursor having a structural unit represented by the formula (2-1) or the polyimide having a structural unit represented by the formula (2-2).

8. The liquid crystal display device of claim 1, further comprising:
a first substrate, and a second substrate, a spacer,
wherein the first and second substrate have liquid crystal alignment films formed on at least one surface thereof,
wherein the first substrate and the second substrate are separated by the spacer and the liquid crystal alignment films present on the surface of the substrates face one another, and
wherein the liquid crystal aligning agent is present in a space formed by the spacer between the first and the second substrates.

9. The liquid crystal display device according to claim 1, wherein from 10 to 100 mol % of B in formulae (2-1) and (2-2) is a structure represented by a formula selected from the group consisting of the following formulae (10)-(13):

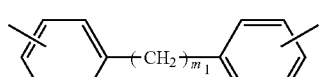
(10)

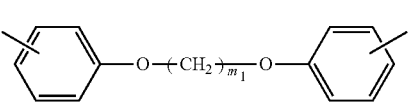
(11)

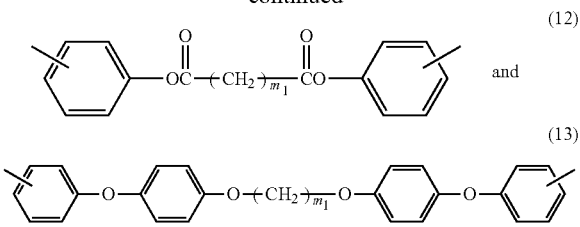

wherein $m_1$ is an integer of from 2 to 8.

10. The liquid crystal display device according to claim 9, wherein from 10 to 100 mol % of B in formulae (2-1) and (2-2) is a structure represented by formula (11) wherein $m_1$ is an integer of from 2 to 8.

11. The liquid crystal display device according to claim 9, wherein X in the formula (1) is one or more structures of tetracarboxylic acid having its four carboxy groups removed, wherein said tetracarboxylic acid is one member selected from the group consisting of 1,2,3,4-cyclobutanetetracarboxylic acid, 2,3,5-tricarboxycyclopentylacetic acid, 3,4-dicarboxy-1,2,3,4-tetrahydro-1-naphthalenesuccinic acid, 1,2,3,4-butanetetracarboxylic acid, pyromeritic acid, 3,3',4,4'-biphenyltetracarboxylic acid, 3,3',4,4'-benzophenonetetracarboxylic acid and 1,4,5,8-naphthalenetetracarboxylic acid; and Y in the formula (2-1) and (2-2) is one or more structures of tetracarboxylic acid having its four carboxy groups removed, wherein said tetracarboxylic acid is one member selected from the group consisting of pyromellitic acid, 3,3',4,4'-biphenyltetracarboxylic acid, 3,3', 4,4'-benzophenonetetracarboxylic acid, bis(3,4-dicarboxyphenyl)ether, bis(3,4-dicarboxyphenyl)sulfone, 2,3,6,7-naphthalenetetracarboxylic acid, 1,2,3,4-cyclobutanetetracarboxylic acid, 2,3,5-tricarboxycyclopentylacetic acid, and 3,4-dicarboxy-1,2,3,4-tetrahydro-1-naphthalenesuccinic acid.

12. The liquid crystal display device according to claim 11, wherein from 10 to 100 mol % of B in formulae (2-1) and (2-2) is a structure represented by formula (11) wherein $m_1$ is an integer of from 2 to 8.

13. The liquid crystal display device according to claim 1, wherein the polyimide precursor has a volume resistivity of $1\times10^{12}$ to $1\times10^{14}$ Ωcm.

14. The liquid crystal display device according to claim 1, wherein the polyimide precursor has a volume resistivity of $1\times10^{12}$ to $5\times10^{13}$ Ωcm.

15. The liquid crystal display device according to claim 1, wherein the phenyl groups of formula (6) are substituted at 4 and 4' positions.

16. The liquid crystal display device according to claim 1, wherein R represents at least one alkyl group selected from the group consisting of a methyl group, an ethyl group, an n-propyl group and isopropyl group.

17. The liquid crystal display device according to claim 1, wherein the polyimide precursor has a volume resistivity of $1\times10^{10}$ to $1\times10^{12}$ Ωcm.

18. The liquid crystal display device according to claim 1, wherein the liquid crystal alignment film consists of a polyimide consisting of atoms of carbon, nitrogen, oxygen and hydrogen.

* * * * *